2,910,375
METHOD OF PRODUCING SILICA

Edward M. Allen, Doylestown, Ohio, assignor to Columbia-Southern Chemical Corporation, a corporation of Delaware No Drawing. Continuation of application Serial No. 204,493, January 4, 1951. This application July 13, 1954, Serial No. 443,139

14 Claims. (Cl. 106—306)

This invention is directed to a novel method of producing finely divided silica in a form and particle size which is suitable for use as a reinforcing pigment in rubber, as a filler in paper compositions, as a diluent for insecticides, or for other uses. It is known that silica may be prepared by reaction of certain salts of silicic acid with acids whereby, upon acidification, silica is formed. In most cases, however, the silica is precipitated in the form of hydrated silica or silicic acid and in a gelatinous state. Upon drying such a product, the material conventionally known as silica gel is generally produced. Such a product, while valuable for many purposes, is not suitable for use as a reinforcing pigment in rubber compositions, nor is it useful as a filler in paper and other miscellaneous compositions.

In a few cases, by recourse to special processes, it has been found possible to effect neutralization of a silicic acid salt and achieve formation of a silica in a non-gelatinous form. However, in most of these instances, the product which is obtained after drying, while useful as a filler for some purposes, has little or no reinforcing properties in rubber compositions and usually is found to have no appreciable advantages over finely ground silica sand.

In accordance with the present invention it has been found that finely divided silica having superior reinforcing properties in rubber may be produced by reacting a finely divided calcium silicate having an average particle size substantially below 1 micron, and preferably having an average ultimate particle size below 0.1 micron, with an aqueous solution of ammonium chloride. Especially advantageous results accrue in the above process when a specially prepared calcium silicate is treated as hereinafter explained and/or the reaction is conducted using a solution of ammonium chloride which contains enough free ammonia to establish a pH in the ammonium chloride solution above 7. However, valuable silica compositions may be prepared using ammonium chloride solutions having a pH above or below and including 7.

The exact composition of the pigment which is obtained by such a process depends to a large degree upon the amount of ammonium chloride which is used. Thus, where less than the stoichiometric amount of ammonium chloride required to react with the calcium silicate is used, the product is a mixture of calcium silicate and silica (or silicic acid). On the other hand, where the stoichiometric amount of ammonium chloride is used, the product is largely silica, usually in a hydrated form. The reaction appears to proceed according to the following equation:

$$2NH_4Cl + CaO \cdot (SiO_2)_x \rightarrow CaCl_2 + 2NH_3 + xSiO_2 + H_2O$$

Thus, where two or more moles of ammonium chloride per mole of CaO in the calcium silicate is used, the product is primarily silica or hydrated silica. On the other hand, where less than 2 moles of ammonium chloride is used per mole of calcium oxide in the calcium silicate, the product is a mixture of calcium silicate with silica or hydrated silica. For most purposes, enough ammonium chloride should be used to react with at least 50 percent of the calcium silicate. That is, the amount of ammonium chloride used normally is in excess of one mole per mole of calcium silicate.

In order to obtain a product which has desirable pigmentary reinforcing characteristics when used in rubber and which has advantageous filling characteristics in other compositions, it has been found desirable to use calcium silicate having an average particle size below about 1 micron; and to obtain a pigment having the best properties, it is necessary to treat an alkaline earth metal silicate having an average ultimate particle size below about 0.1 micron as determined by the electron microscope. Thus, some care in selecting a proper calcium silicate from which to prepare the contemplated product generally is found to be essential.

The precipitation of calcium silicate in finely divided state, such as is herein required, may be accomplished successfully by reacting calcium chloride with alkali metal silicate in aqueous medium. Best results are obtained using calcium silicate which is formed by mixing a stream of aqueous calcium chloride solution with a stream of sodium silicate solution under conditions which subject the mixture to a high degree of turbulence and almost instantaneous mixing, and consequent instantaneous reaction. In such a process, the amount of reactants in the respective streams is proportioned so as to obtain calcium silicate in the desired concentration and to establish an excess of calcium chloride over the stoichiometric quantity required to react with the silicate. One effective way to produce the required turbulence is to introduce the two streams closely together into the central area of a centrifugal pump. In this case, the agitation of the mixture is effected as the introduced streams of reactants are thrown radially outward and churned together by the pump rotor. To effect maximum agitation, it is often advantageous to limit the feed of the calcium chloride and alkaline metal silicate solutions to the pump to an amount below the capacity of the pump. For example, if the pump is capable of discharging 100 gallons per minute with unlimited flow of liquid to the pump, the amount of reacting solutions supplied to the pump is held at least 10 percent below, and usually 35 percent below this amount. This appears to afford a greater degree of agitation of the reacting solutions and to ensure production of calcium silicate having the desired fineness. Further, it is desirable to adjust the concentration of silicate and calcium chloride in the solutions so that calcium silicate will be prepared in a concentration approximately equal to about 5 to 150 grams of calcium silicate per liter of solution or slurry. Moreover, in order to ensure production of the calcium silicate in the most finely divided state, an alkali metal silicate having the composition $Na_2O(SiO_2)_x$, where $x$ is a number not less than 2 nor more than about 4, is preferably used. This results in production of calcium silicate having the composition $CaO \cdot (SiO_2)_x$, where $x$ is as defined above.

It will be understood that finely divided silica may be prepared from calcium silicate produced according to other methods, or obtained from other sources. In general, it has been observed that silica prepared from calcium silicate prepared as described above produces the best all round properties when tested in standard rubber recipes. Nevertheless, other calcium silicates yield valuable compositions.

Thus, calcium silicate produced by batch reaction of calcium chloride with sodium silicate in aqueous solution, adding calcium chloride solution to sodium silicate solution or vice versa, may be used according to this invention. Moreover, other calcium salts, such as calcium nitrate, calcium bromide or calcium acetate, may be used in lieu of calcium chloride.

Calcium silicate mineral, such as wollastonite and like calcium silicate minerals, may be used according to this invention.

The reaction of the calcium silicate with the ammonium chloride may be effected simply by adding to an aqueous slurry of the calcium silicate the ammonium chloride, usually in aqueous solution. During this addition the slurry is generally agitated, and ultimately the slurry is heated to drive off free ammonia. Usually this heating is continued until all or substantially all of the free ammonia has been driven off. In most cases, sufficient ammonium chloride is used to ensure decomposition of at least about 50 percent of the calcium silicate. As previously stated, it is found most advantageous to decompose substantially all of the calcium silicate with the ammonium chloride.

Advantageously, the ammonium chloride solution should contain an appreciable amount of ammonia and sodium chloride. Silica which has especially valuable properties has been prepared using such a solution. The ammonia serves, among other purposes, to maintain the pH of the slurry within a range at which a readily filterable slurry is obtained. The amount of ammonia and sodium chloride which may be present is capable of considerable variation. Solutions containing in excess of 5, and usually ranging from 5 to 50 grams per liter of free ammonia, are found to be suitable. The sodium chloride content of solutions used according to this invention normally exceeds 25 grams per liter of solution, usually being in the range of 50 to 100 grams of NaCl per liter of solution.

After reaction of the calcium silicate with the ammonium chloride is completed and the resulting free ammonia has been removed, the resulting slurry is treated to recover the pigment suspended therein. This may be done effectively by conventional decantation and/or filtration operations. In the course of this operation, water soluble salts such as calcium chloride, ammonium chloride, etc., are washed from the pigment and the resulting product is dried at a suitable temperature.

Where a silica containing an appreciable amount of water is desired, the drying operation is conducted at a temperature of 100 to 200° C. and drying is discontinued after the water content of the pigment has been reduced to about 6 to 20 percent by weight. Such water normally will be present both as "free water," which is water which may be driven off upon heating at 105° C. for 24 hours, and as "bound water," which is additional water over and above the "free water" which may be driven off upon calcination. If a substantially water-free pigment is desired, the pigment may be dried at temperatures ranging between 200 to 600° C. In such a case, substantially all of the water is removed.

The resulting product is found to be a very finely divided silica having an average ultimate particle size of below 0.1 micron, usually in the range of 0.01 to 0.05 micron. Many of these particles are present as flocs or agglomerates of particles. The average particle size of such agglomerates is well below 1 micron.

Where the amount of ammonium chloride used in the reaction is equal to or greater than the stoichiometric amount required to react with calcium silicate, the preponderant component of the resulting powder is silica. By analysis even of the hydrated product, more than 75 percent $SiO_2$ is present. The amount of water present will normally range between 0 and 20 percent. Calcium or similar alkaline earth metal may be present in small amount, usually in the range of about 0.5 to 5 percent, computed as calcium oxide or like alkaline earth metal oxide. Also, iron and aluminum oxides in the range of 0.1 to 2 percent frequently are present, as well as minor impurities such as small concentrations of chloride and carbon dioxide.

According to a further embodiment of the invention, some improvement in pigment properties is obtained when the slurry, after heating to remove ammonia is complete, is treated or leached with a small amount of acid, preferably an acid which forms a water soluble compound (solubility greater than 5–10 grams per liter) with calcium. Typical acids are hydrochloric, nitric, acetic acid, and like acids. Such treatment removes a portion or all of the residual calcium, magnesium, iron, aluminum, and other metallic components, and this ensures production of a much purer product.

The product obtained according to this invention is especially suitable for use as a reinforcing pigment in rubber compositions. Various elastomer or rubber compositions, including those compositions produced from natural rubber and synthetic rubbers, such as butadiene-styrene copolymers known as "GR–S" rubber, butadiene-acrylonitrile copolymers, butadiene-isobutylene copolymers, etc., may be used. In addition to their usefulness as reinforcing agents in natural and synthetic rubber compositions, the novel silica compositions herein contemplated may be incorporated into other materials. For example, the silica is useful as a filler or reinforcing agent in certain other plastic compositions, such as polyvinyl chloride or copolymers of polyvinyl chloride with other materials, including vinyl acetate, in which the vinyl chloride is the preponderant component. Moreover, the resulting product may be used as a filler in paper and other animal and vegetable fibrous compositions, or diluent in various insecticidal compositions. For example, benzene hexachloride, DDT, chlordane, 2,4–D, and like materials may be diluted with silica pigment prepared according to this invention, and the compositions used as insecticides, weedicides, herbicides, etc.

The following examples are illustrative:

*Example I*

An aqueous solution of sodium silicate was prepared by diluting 5.88 liters of sodium silicate containing 298 grams per liter of $SiO_2$ as sodium silicate having the composition $Na_2O(SiO_2)_{3.36}$, with sufficient water to produce 20.7 gallons of solution. A further solution was made by dissolving 1220 grams of calcium chloride and 320 grams of sodium chloride in 16.0 gallons of water. Streams of these aqueous solutions were fed directly into the central area of a centrifugal pump, proportioning the rates of flow so that calcium chloride remained in excess over the stoichiometric quantity required for reaction with the sodium silicate at all times. After mixing of the two solutions was complete, 475 grams of ammonium chloride was added to the resulting calcium silicate slurry and the slurry was thereafter boiled for about 4 hours, at which time the odor of ammonia was very faint. Thereafter, the slurry was washed and filtered, and was dried at a temperature of about 120° C. A white friable product having the following composition was produced:

| | Percent by weight |
|---|---|
| Ignition loss | 13.67 |
| $SiO_2$ | 77.84 |
| $R_2O_3$ (iron and aluminum) | 1.30 |
| CaO | 5.88 |
| MgO | 1.36 |

The average ultimate particle size of this product is in the range of 0.01 to 0.05 micron.

*Example II*

47.1 liters of sodium silicate solution containing 298 grams per liter of $SiO_2$ as $Na_2O \cdot (SiO_2)_{3.36}$ was diluted to 145 gallons. 87.5 gallons of an aqueous solution containing 10,650 grams of calcium chloride and 2,800 grams of sodium chloride was made up. These solutions were mixed with vigorous agitation as in Example I. The slurry precipitate was washed to remove dissolved chlorides, and an aqueous slurry containing 42.7 grams of calcium silicate per liter of slurry was obtained. Fifty gallons of this calcium silicate slurry was mixed with 23.19 liters of aqueous ammonium chloride solution prepared from the preparation of soda ash according to the Solvay process by reaction of sodium chloride, ammonia, and carbon dioxide, in aqueous solution. This solution contained 160 grams per liter of $NH_4Cl$ and about 20 grams per liter of free ammonia, together with about 70 grams per liter of NaCl.

The resulting mixture was heated to boiling until no further ammonia was given off. Thereafter, the precipitate was filtered, washed, dried, and pulverized. The resulting product is preponderantly $SiO_2$ and is a useful rubber pigment. It was compounded with a GR–S composition according to the following formula:

| | Parts by weight |
|---|---|
| GR–S | 100.0 |
| Zinc oxide | 5.0 |
| Sulphur | 3.0 |
| n-Cyclohexyl 2-benzothiazol sulphenamide | 1.0 |
| Processing oil | 5.0 |
| Phenyl beta naphthyl amine | 1.0 |
| Silica as prepared above | 68.2 |

*Example III*

Calcium silicate slurry was prepared according to the process generally described in Example I, using an aqueous solution of sodium silicate containing 100 grams per liter of $SiO_2$ as $Na_2O(SiO_2)_{3.36}$, and calcium chloride solution containing 100 grams per liter of $CaCl_2$ and 30 to 40 grams per liter of NaCl at a temperature of 150° F. The resulting slurry of calcium silicate contained 0.35 equivalent per liter of alkalinity as determined by titration with HCl to methyl orange end point.

One hundred gallons of this calcium silicate slurry was placed in a tank and mixed with 20 gallons of ammonium chloride solution containing 1.95 equivalents of $NH_4Cl$ per liter of solution as well as 15 grams per liter of free ammonia and 70 grams per liter of NaCl.

The resulting slurry was heated by passing the slurry in countercurrent contact with steam in a 6-inch glass lined steel column packed to a depth of 18 feet with ½ inch Berl saddles. In this operation, the slurry was fed to the top of the column at a rate of 10 gallons per hour and substantially saturated steam fed to the bottom of the column at a rate of 50 pounds per hour, ammonia being withdrawn from the top of the column. The resulting slurry had a pH of 7.6.

After filtration and drying at a temperature of about 100 to 120° C., the product had the following composition:

| | | |
|---|---|---|
| Chloride | percent by weight | 0.47 |
| Free $H_2O$ | do | 10.45 |
| Ignition loss | do | 12.49 |
| CaO | do | 1.85 |
| $SiO_2$ | | Balance |
| pH | | 8.2 |

This product is an effective rubber reinforcing pigment.

*Example IV*

Twelve gallons of silica slurry prepared as described in Example III, after the steam treatment, was mixed with 200 cubic centimeters of an aqueous solution of hydrochloric acid containing 32 percent by weight of HCl. The resulting mixture was allowed to digest at a temperature of 30° C. for 16 hours. Thereafter, the slurry was filtered and the resulting silica dried. This product, when incorporated in rubber according to standard methods, yielded results which were superior to those obtained using silica prepared according to Example III.

The pigmentary product which has been produced according to the above described examples is of especial interest because of its unusually superior reinforcing properties in rubber. For many years it has been recognized that a white pigment which would have the reinforcing properties of carbon black would be desirable, particularly in preparation of colored rubber stocks. The product produced according to the present invention ranks among the best and is superior to most of the white pigments of which applicant is aware.

Although the present invention has been described with reference to the specific details of certain embodiments thereof, it is not intended that such details shall be regarded as limitations upon the scope of the invention except insofar as included in the accompanying claims.

This application is a continuation of my application Serial No. 204,493, filed January 4, 1951, now abandoned.

What is claimed:

1. A method of preparing finely divided silica which comprises merging flowing streams of calcium chloride aqueous solution and aqueous sodium silicate, vigorously agitating the streams at the point of mergence whereby to achieve instantaneous mixing of the streams and to produce a flowing stream of a slurry of calcium silicate while adjusting the flow of said streams so that calcium chloride is in excess over the stoichiometric quantity required for reaction, reacting the resulting solid calcium silicate in said slurry with ammonium chloride whereby to produce finely divided silica, and recovering the finely divided silica thus obtained.

2. A method of preparing finely divided silica which comprises reacting calcium chloride and sodium silicate in aqueous solution to produce a precipitate of calcium silicate, having an average particle size below about 0.1 micron, reacting in a liquid medium the resulting solid calcium silicate with an amount of ammonium chloride sufficient to react with at least 50 percent of the calcium silicate whereby to produce finely divided silica, and recovering the finely divided silica thus obtained.

3. A method of preparing finely divided pigment which comprises reacting a water soluble alkaline earth metal salt with an alkali metal silicate in aqueous solution to produce a precipitate of alkaline earth metal silicate having an average particle size below about 1 micron, reacting in a liquid medium the resulting solid alkaline earth metal silicate with ammonium chloride in amount sufficient to react with at least 50 percent of the alkaline earth metal silicate whereby to produce finely divided pigment, and recovering the finely divided pigment thus obtained.

4. The process of claim 3 wherein the ammonium chloride is in the form of a solution containing at least 5 grams per liter of free $NH_3$.

5. The process of claim 3 wherein the alkaline earth metal silicate has an average ultimate particle size below 0.1 micron.

6. The process of claim 3 wherein the ammonium chloride is in the form of an aqueous solution containing ammonium chloride and sodium chloride.

7. A method of preparing finely divided silica which comprises reacting calcium chloride in aqueous solution with sodium silicate in aqueous solution, maintaining the calcium chloride in excess over the stoichiometric quantity required for reaction and vigorously agitating said aqueous solutions to achieve instantantous mixing thereof to produce calcium silicate having an average particle size below about 0.1 micron, reacting in a liquid medium the resulting solid calcium silicate with an amount of ammonium chloride sufficient to react with at least 50 percent of the calcium silicate and solubilizing in the liquid medium a substantial portion of the calcium in the calcium silicate and to form finely divided silica, and reacting the silica with acid whereby to remove at least a portion of residual calcium therein.

8. A method of preparing a finely divided pigmentary material which comprises reacting finely divided, pulverulent, solid, alkaline earth metal silicate having an average particle size below about 1 micron in an aqueous medium with an amount of ammonium chloride sufficient to react with a substantial portion of the alkaline earth metal silicate and thus to solubilize a substantial portion of the alkaline earth metal therein, leaving a solid pigmentary material of higher $SiO_2$ content, and recovering the pigment thus obtained.

9. A method of preparing a finely divided pigmentary material which comprises reacting finely divided, pulverulent, solid calcium silicate having an average ultimate particle size below 0.1 micron in aqueous medium with an amount of ammonium chloride sufficient to react with at least 50 percent of the calcium silicate whereby to solubilize a substantial portion of the calcium therein, and separating the resulting aqueous medium from the resulting pigment.

10. A method of preparing a finely divided pigmentary material which comprises reacting finely divided, pulverulent, solid alkaline earth metal silicate, having an average ultimate particle size below 0.1 micron, in aqueous medium with an amount of ammonium chloride sufficient to react with at least a substantial portion, but not all, of the alkaline earth metal silicate and thereby to solubilize a substantial portion of the alkaline earth metal in said silicate, and separating the resulting aqueous medium from the resulting pigment.

11. A method of preparing a finely divided pigmentary material which comprises reacting finely divided, pulverulent, solid calcium silicate having an average particle size below about 0.1 micron in aqueous medium with an amount of ammonium chloride sufficient to react with at least a substantial portion, but not all, of the calcium silicate and thereby to solubilize a substantial portion of the calcium in said silicate, leaving a solid pigmentary material of higher $SiO_2$ content, and separating the resulting aqueous medium from the resulting pigment.

12. The process of claim 9 wherein the ammonium chloride solution contains at least 25 grams per liter of sodium chloride.

13. The process according to claim 2 wherein the amount of ammonium chloride is sufficient to react with substantially all of the calcium silicate.

14. A method of preparing a finely divided pigmentary material which comprises reacting calcium chloride in aqueous solution with sodium silicate in aqueous solution, maintain the calcium chloride in excess over the stoichiometric quantity required for reaction and vigorously agitating said aqueous solution to achieve instantaneous mixing thereof to produce calcium silicate having an average ultimate particle size below about 1 micron, reacting in aqueous medium the resulting water insoluble calcium silicate with an amount of ammonium chloride sufficient to react with a substantial portion of the calcium silicate, heating to remove free ammonia from this aqueous medium, solubilizing a substantial portion of the calcium of said calcium silicate as water soluble calcium chloride and leaving a water insoluble pigmentary material of higher $SiO_2$ content, and recovering the pigment thus obtained.

References Cited in the file of this patent

UNITED STATES PATENTS

| | | |
|---|---|---|
| 1,270,093 | Arsem | June 18, 1918 |
| 2,093,106 | Ayers | Sept. 14, 1937 |
| 2,114,123 | Heuser | Apr. 12, 1938 |
| 2,204,113 | Allen | June 11, 1940 |
| 2,237,374 | Smith | Apr. 8, 1941 |
| 2,287,700 | Muskat et al. | June 23, 1942 |
| 2,314,188 | Allen | Mar. 16, 1943 |
| 2,805,956 | Pechukas | Sept. 10, 1957 |

FOREIGN PATENTS

| | | |
|---|---|---|
| 653,993 | Great Britain | May 30, 1951 |

OTHER REFERENCES

Jacobson: "Encyclop. of Chem. React.," 1948, vol. II, page 170.